July 25, 1944. C. M. OERTEL 2,354,606
INTERNAL COMBUSTION ENGINE VALVE CONTROL
Filed July 17, 1942
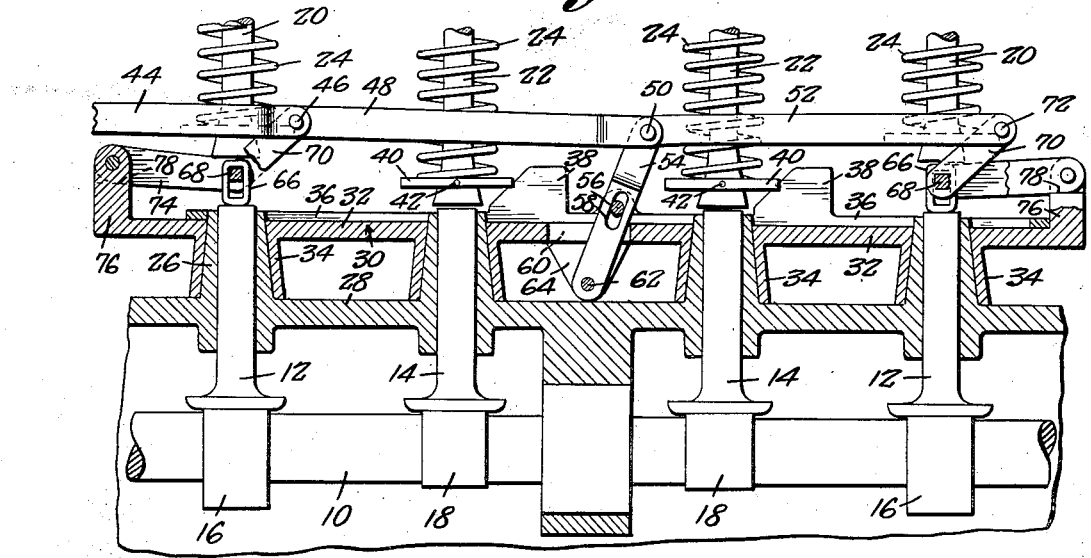
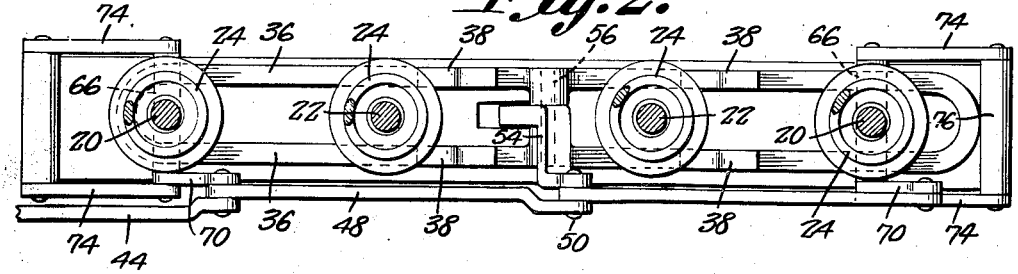
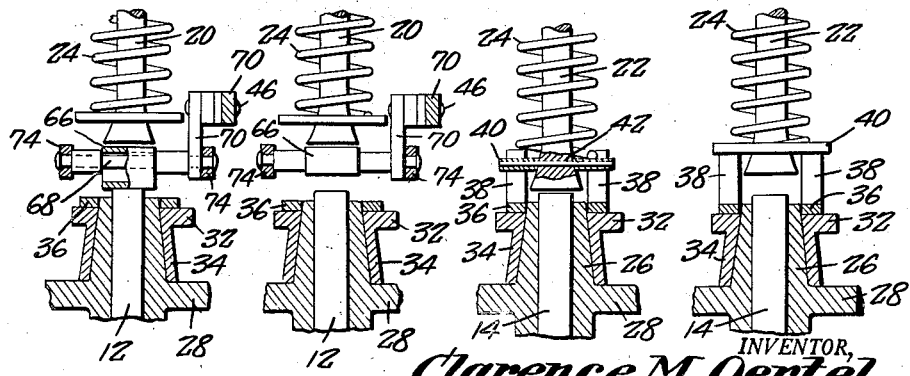
INVENTOR,
Clarence M. Oertel.
BY
Victor J. Evans & Co.
ATTORNEYS Patented July 25, 1944

2,354,606

UNITED STATES PATENT OFFICE 2,354,606

INTERNAL-COMBUSTION ENGINE VALVE CONTROL

Clarence M. Oertel, Detroit, Mich.

Application July 17, 1942, Serial No. 451,353

2 Claims. (Cl. 74—569)

My invention relates to internal combustion engines, and has among its objects and advantages the provision of an improved valve control designed to render cylinders of the engine inoperative as power units or for compression braking purposes under operating conditions which render such an engine condition desirable.

In the accompanying drawing:

Figure 1 is a sectional detail view of the invention;

Figure 2 is a top plan view;

Figure 3 is a sectional view illustrating the normal condition of the intake valve control;

Figure 4 is a similar view illustrating the intake valve control adjusted to maintain the valve in a closed position;

Figure 5 is a sectional detail view of the exhaust valve control in its normal position; and Figure 6 is a similar view illustrating the exhaust valve latched in an open position.

In the embodiment selected for illustration, Figure 1 illustrates a fragment of a conventional cam shaft 10 such as is employed in conventional internal combustion engines for actuating the intake and exhaust valve lifting rods. Two intake valve lifting rods 12 and two exhaust valve lifting rods 14 are shown in Figure 1 in conjunction with cams 16 and 18, respectively, fixed to the shaft 10 in the conventional manner for elevating the rods through rotation of the shaft. Intake valve stems 20 are arranged in axial alignment with the lifting rods 12 and similar exhaust valve stems 22 are arranged in axial alignment with the lifting rods 14. All the valve stems 20 and 22 are biased to valve closing positions by compression springs 24.

The lifting rods 12 and 14 are slidably guided in sleeves 26 on a supporting member 28. Upon this member is mounted a valve control 30 comprising a plate 32 having tubular elements 34 receivable on the sleeves 26. The plate 32 has its upper face lying slightly beneath the upper ends of the sleeves 26.

On the plate 32 is mounted a frame 36 through which the upper ends of the sleeves 26 project to guide the frame when moved longitudinally but to restrain the frame from lateral movement. Four cams 38 are attached to the frame 36 for engagement with the washers 40 keyed at 42 to the exhaust valve stems 22. Two cams 38 are provided for each washer 40, and the cams are so spaced as to engage the two washers on opposite sides of their respective exhaust valve stems. Figure 1 illustrates the normal position of the frame 36 at which time the cams 38 are spaced to one side of the washers 40 so that the exhaust valve stems 22 may operate in a normal manner for coaction with the valve lifting rods 14.

Figure 1 illustrates the valve stems 20 and 22 for two cylinders of the engine. In an engine of four cylinders, the valve control of Figure 1 may advantageously be associated with the valve stems of the two intermediate cylinders. To latch the exhaust valve stems 22 in valve opening positions, the frame 36 is shifted to the left when viewing Figure 1 to bring the cams 38 underneath the washers 40 to elevate the valve stems 22 and hold their exhaust valves open until the frame is returned to its normal position of Figure 1.

The frame 36 is actuated through the medium of a rod 44 which may be extended to a position within convenient reach of the operator and pivotally connected at 46 with a bar 48 pivotally connected at 50 with a bar 52 and a lever 54. A pin 56 on the frame 36 extends loosely through a slot 58 in the lever 54, the lever extending through a slot 60 in the member 32 for pivotal connection at 62 with a lug 64 depending from the member 32. Thus a pull on the rod 44 will pivot the lever 54 for shifting the frame 36 relatively to the member 32.

Interposed between the lifting rods 12 and the intake valve stems 20 are cams or fillers 66 in the nature of rectangular loops normally arranged with their major axes coaxially of the lifting rods 12 and the valve stems 20. Figure 1 illustrates the cams 66 in their normal positions at which time the cams function as continuations of the lifting rods 12 to actuate the valve stems 20.

Shifting of the frame 36 to latch the exhaust valves in their open positions simultaneously imparts a ninety degree rotation to the cams 66 to bring their minor axes into coaxial relationship with the rods 12 and the valve stems 20. When so positioned, the thickness of the cams is such as to render the lifting rods 12 inoperative with respect to their lifting function so that the intake valves will remain closed. Means for rotating the cams 66 comprise rectangular shafts 68 extending through the respective cams 66 and each connected with an arm 70, one of which is connected with the rod 44 by reason of the pivotal connection 46 and the other of which is pivotally connected at 72 with the bar 52. To each shaft 68 are connected two links 74 pivotally connected with a lug 76 on the member 32. While the arms 70 are fixedly connected with the respective shafts 68, the links 74 are loosely connected with the respective shafts so that the latter may be rotated relatively to the links. Both lugs 76 are provided with abutments 78 which prevent the links 74 from pivoting downwardly beyond the positions of Figure 1.

Figure 3 illustrates the normal position of one of the cams 66, with Figure 4 illustrating the cam rotated ninety degrees to provide sufficient space between the cam and the lifting rod 12 to render the latter inoperative for valve lifting purposes. Since the links 74 are restrained from downward pivotal movement beyond the positions of Figure 1, the cams 66 are effectively held in elevated positions when adjusted in accordance with Figure 4 so as to eliminate contact with their lifting rods 12. Adjustment of the rod 44 sufficiently far to impart ninety degrees of rotation to the cams 36 is sufficient to bring the cams 38 underneath the washers 40 so that the exhaust valves are latched in open positions simultaneously with the closing of the intake valves. Thus two cylinders of the engine are rendered inoperative as power units. Accordingly, the power units of the engine may be reduced to effect economy in fuel consumption.

Without further elaboration, the foregoing will so fully illustrate my invention, that others may, by applying current knowledge, readily adapt the same for use under various conditions of service.

I claim:

1. Control mechanism for an engine having a co-axial stem and lifting rod and a coiled compression spring sleeved about the stem, a support member mounted to slide transversely of the axes of the stem and rod, and a pair of transversely spaced wedge cams fixed on the support operative to engage and lift the spring with the stem when the support is in one operative position and to release the spring and stem when said support is moved to its reverse position.

2. Control mechanism for an engine having a lifting rod, a stem coaxial with and operative through contact with the lifting rod and a compression spring sleeved about the stem to yieldingly urge the same into contact with the lifting rod, comprising a support plate, a frame mounted to slide on the plate in a plane transverse to the axes of the stem and rod, a pair of transversely spaced wedge cams carried on and projecting outwardly of the frame, said cams being disposed to engage the spring so as to move the same and the stem out of operative contact with the lifting rod when the frame is in one position and to release the spring when the frame is moved to its reverse position, and means connected to the frame for selectively sliding the same to spring engaging or releasing positions.

CLARENCE M. OERTEL.